United States Patent
Nakamura

[11] Patent Number: 6,055,331
[45] Date of Patent: Apr. 25, 2000

[54] IMAGE PROCESSING APPARATUS

[75] Inventor: Koji Nakamura, Osaka, Japan

[73] Assignee: Mita Industrial Co., Ltd., Osaka-fu, Japan

[21] Appl. No.: 09/065,215

[22] Filed: Apr. 23, 1998

[30] Foreign Application Priority Data

Apr. 25, 1997 [JP] Japan ................................. 9-109667

[51] Int. Cl.$^7$ ................................. G03F 3/08; G06K 9/00
[52] U.S. Cl. ................................. 382/168; 358/521
[58] Field of Search ................................. 382/168, 169, 382/172, 162, 163, 167; 358/521, 518, 523, 534, 458

[56] References Cited

U.S. PATENT DOCUMENTS

| | | | |
|---|---|---|---|
| 4,969,053 | 11/1990 | Outa et al. | 358/458 |
| 5,321,767 | 6/1994 | Murase | 382/149 |
| 5,748,336 | 5/1998 | Kakutani | 358/458 |
| 5,841,899 | 11/1998 | Ide et al. | 382/168 |

*Primary Examiner*—Madeleine Nguyen
*Attorney, Agent, or Firm*—Jordan and Hamburg LLP

[57] ABSTRACT

During pre-scanning, a CPU calculates a gradation data width corresponding to the number of pixels which are 0.3% of the total pixels from a minimum value in a frequency distribution curve of gradation data of all pixels; calculates effective minimum and maximum values from the minimum and maximum values of the gradation data of all pixels and the gradation data width. A gradation correction i performed in a gradation correcting device during main scanning using following equation:

$$f(x) = [\{255-(S+L)\}x^2 + (S+L)^2 x - SL(S+L) - 255S^2]/(L^2-S^2)$$

where
 x: gradation data before the correction
 S: effective minimum value
 L: effective maximum value
 f(x): gradation data after the correction.

34 Claims, 11 Drawing Sheets

0　　　　　　　　　　　　255

IMAGE PROCESSING APPARATUS

The present invention relates to an image processing apparatus for correcting a gradation data of an image obtained by reading an original.

BACKGROUND OF THE INVENTION AND RELATED ART STATEMENT

Conventionally, in a monochromatic digital copier of electrophotography system, a reflected light from an illuminated color original is received by photoelectric conversion elements such as CCDs via color separation filters of red (R), green (G) and blue (B). In this way, color separation is applied to obtain light reception signals R, G, B in proportion to the light intensities of R-, G- and B-components. After analog-to-digital (A/D) conversion is applied to these signals to obtain digital values, density conversion is applied to obtain color image data of cyan (C), magenta (M), yellow (Y) in proportion to densities.

Subsequently, the monochromatic or color image data having the density conversion applied thereto are subjected to a variety of image processings including a black generation, a color correction, a magnifying processing, a spatial filtering and a gradation correction, thereby correcting the image data. An output is controlled using the corrected image data.

The above gradation correction is performed by correcting a gradation data in order to prevent a fogging and to obtain a desired or suitable density, and the following two methods (1), (2) are known for this correction.

(1) For example, in the case of a color copier, gradation data within a range determined by predetermined threshold value(s) are extracted as effective image data from a frequency distribution curve of the gradation data of all pixels corresponding to the light reception signal G representing a characteristic most approximate to lightness among the light reception signals R, G, B or to the image data M representing a characteristic most approximate to lightness among the image data C, M, Y, and the gradation correction is performed using the effective image data.

(2) Japanese Unexamined Patent Publication No. 7-184070 discloses a gradation correction for converting a gradation data of an inputted image by following equation (1) which is a linear conversion equation:

$$h(x)=255(x-\alpha)/(\beta-\alpha) \quad (1)$$

It should be noted that the image data is converted into a digital data of 8 bits by the A/D conversion and that $\alpha$, $\beta$, x and h(x) denote minimum and maximum values of the gradation data of the inputted image, a gradation data before a correction and a gradation data after the correction, respectively.

By performing this gradation correction, $h(\alpha)=0$ when $x=\alpha$, $h(\beta)=255$ when $x=\beta$, in other words, the gradation data of $\alpha \leq x \leq \beta$ is uniformly converted into gradation data of $0 \leq h(x) \leq 255$.

However, color may change since the gradation data is obtained from the frequency distribution curve of the gradation data of all pixels corresponding only to the image data M representing a characteristic most approximate to lightness according to the prior art method (1).

On the other hand, according to the prior art method (2), equation (1) is a linear equation. As can be seen from equation (1), in the case that the data are identically distributed where $(\beta-\alpha)$ is the same in the range $\alpha \leq x \leq \beta$, the distribution of the gradation data after the correction is identical even if the values of $\alpha$, $\beta$ of the original image differ. Thus, if the gradation correction is performed by equation (1), information carried by the original image may be lost.

In view of the above problems residing in the prior art, an object of the present invention is to provide an image processing apparatus which can provide a satisfactory image corresponding to an original image by an improved gradation correction.

SUMMARY OF THE INVENTION

Accordingly, the invention is directed to an image processing apparatus for applying a data processing to a gradation data obtained for each pixel of an input image, comprising:

effective minimum value calculation means for calculating a minimum gradation data of a gradation data group which is the gradation data of all pixels of the input image minus those of a predetermined p% of pixels from the minimum gradation data as an effective minimum value of effective image data, effective maximum value calculation means for calculating a maximum gradation data of a gradation data group which is the gradation data of all pixels of the input image minus those of a predetermined q% of pixels from the maximum gradation data as an effective maximum value of the effective image data, and gradation correction means for correcting the gradation data of all pixels of the input image between the effective minimum value and the effective maximum value in accordance with a predetermined function using the effective minimum and maximum values as parameters.

With this construction, the minimum gradation data of the gradation data group which is the gradation data of all pixels of the input image minus those of the predetermined p% of pixels from the minimum gradation data is calculated as an effective minimum value of the effective image data, and the maximum gradation data of the gradation data group which is the gradation data of all pixels of the input image minus those of the predetermined q% of pixels from the maximum gradation data is calculated as an effective maximum value of the effective image data. Then, a satisfactory image can be obtained by correcting the gradation data of all pixels of the input image between the effective minimum value and the effective maximum value in accordance with the predetermined function using the effective minimum and maximum values as parameters.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
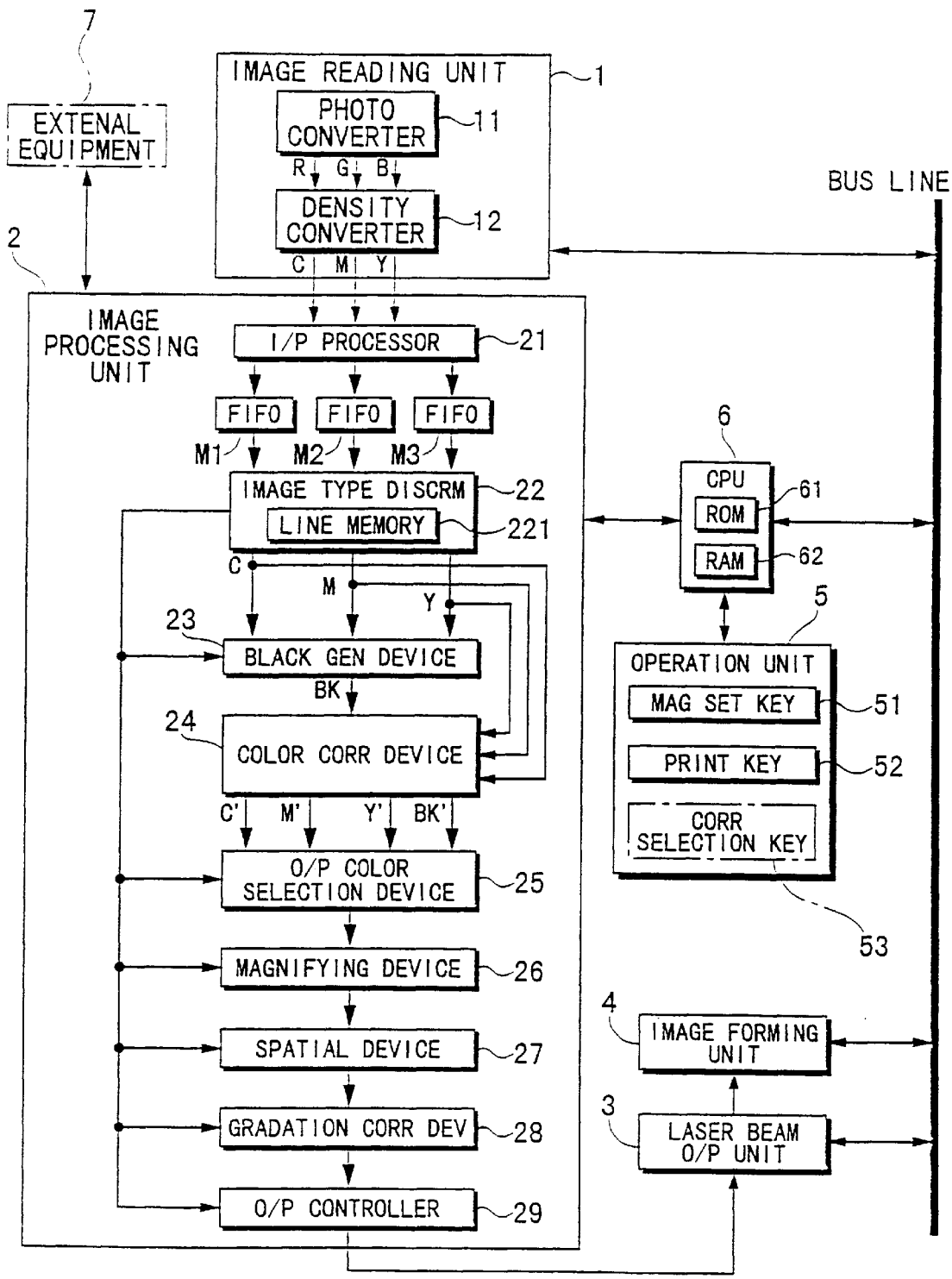
FIG. 1 is a block diagram showing the construction of one embodiment of a color digital copier to which an image processing apparatus according to the invention is applied.

FIG. 1 is a block diagram showing the construction of one embodiment of a color digital copier to which an image processing apparatus according to the invention is applied.

This color digital copier is, as shown in FIG. 1, provided with an image reading unit 1, an image processing unit 2, a laser beam output unit 3, an image forming unit 4, an operation unit 5 and a CPU 6.

The image reading unit 1 is provided with an unillustrated illumination means for illuminating a color original to be copied, a photoelectric converter 11 and a density converter 12 and is adapted to obtain color image data C, M, Y by reading the color original.

The image processing unit 2 is provided with an input processor 21, an image type discriminator 22, a black generating device 23, a color correcting device 24, an output color selecting device 25, a magnifying device 26, a spatial filter 27, a gradation correcting device 28 and an output controller 29 and is adapted to apply specified processings to be described later to the color image data C, M, Y obtained in the image reading unit 1.

The laser beam output unit 3 projects a laser beam corresponding to the color image data processed in the image processing unit 2 onto a precharged photosensitive member of the image forming unit 4, thereby forming an electrostatic latent image on the surface of the photosensitive member.

The image forming unit 4 is provided with unillustrated photosensitive member, developing device, sheet conveying assembly and fixing device and is adapted to develop the electrostatic latent image formed on the surface of the photosensitive member successively with color toners of cyan (C), magenta (M) and yellow (Y) and a black (BK) toner for each color, and transfer the developed image to a copy sheet conveyed to the photosensitive member and fix the transferred toner image formed by transferring four toner images onto the copy sheet.

The photoelectric converter 11 of the image reading unit 1 is comprised of a multitude of photoelectric conversion elements (hereinafter, "CCD line sensor") which are arrayed in a line for receiving a reflected light from fine areas (hereinafter, "pixels") of the illuminated color original, R-, G-, B-filters which is provided on light paths of the reflected light for splitting the reflected light into red (R), green (G) and blue (B) which are three primary colors according to the additive process, and an A/D converter. The photoelectric converter 11 photoelectrically converts the reflected light into analog color image signals of three primary colors in proportion to the light intensities of R-, G- and B-components, and converts this analog color image signal into a digital color image data of R, G, B of a specified number of bits (8 bits in this embodiment).

The density converter 12 converts the color image data R, G, B into color image data C, M, Y in proportion to the densities of complimentary colors of the three additive primaries, i.e. three subtractive primaries cyan (C), magenta (M) and yellow (Y).

The input device 21 of the image processing unit 2 eliminates or reduces a difference between a reference clock frequency in the image reading unit 1 and a reference color frequency in the image processing unit 2 by converting the reference clock frequency during the transmission of the respective color image data C, M, Y, and removes noise from the image data.

The input device 21 also stores the color image data C, M, Y after the respective processings in FIFO (first-in, first-out) memories M1, M2, M3.

The image type discriminator 22 is provided with a line memory 221 for storing a color image data of a plurality of lines of the CCD line sensor. The discriminator 22 reads a plurality of lines of the respective color image data C, M, Y stored in the FIFO memories M1, M2, M3 and stores them in the line memory 221. Further, the discriminator 22 discriminates which of a character area, a picture area and a dot area the target color image data belongs to using a plurality of lines of the color image data stored in the line memory 221.

The image type discriminator 22 performs the above discrimination using a known technique such as the one disclosed in Japanese Unexamined Patent Publication No. 8-149298, and sends the discrimination result to the black generating device 23, the color correcting device 24, the magnifying device 26, the spatial filter 27, the gradation correcting device 28 and the output controller 29 as shown in FIG. 1. Further, the discriminator 22 synchronously reads the color image data C, M, Y of the same pixel from the FIFO memories M1, M2, M3 and sends them to the black generating device 23.

The black generating device 23 performs an undercolor removal to generate a black image data BK using the color image data C, M, Y. The color correcting device 24 corrects the respective image data C, M, Y, BK using the generated black image data BK and outputs the corrected image data C', M', Y', BK'. The output color selecting device 25 selects one of the image data C', M', Y', BK' and outputs the same. The magnifying device 26 enlarges or reduces the selected image data according to a set magnification.

The spatial filter 27 applies known filtering such as edge emphasis or smoothing according to the discrimination result of the image type discriminator 22. The edge emphasis is applied in the case of the character area, whereas the smoothing is applied in the case of the picture area and the dot area.

The gradation correcting device 28 corrects the gradation data using the range of the effective image data obtained by the CPU 6. This processing is described in detail later. The output controller 29 controls the laser beam emission of the laser beam output unit 3 according to the image data sent from the gradation correcting device 28.

The operation unit 5 includes a magnification setting key 51 for setting a copying magnification, a print key 52 for instructing the start of the copying operation, etc.

The CPU 6 is internally provided with a ROM 61 and a RAM 62 and controls the operations of the respective units.

The CPU 6 causes the image reading unit 1 to perform pre-scanning during the copying operation; obtains the range of the effective image data in accordance with a procedure to be described later using the image data to which the respective processings were applied in the input device 21; and stores the obtained data in the RAM 62.

The CPU 6 also causes the image reading unit 1 to perform main scanning after the pre-scanning, and performs the actual copying operation using the image data obtained by this main scanning.

The pre-scanning may be performed by the CCD line sensor while weeding out the data every specified number of lines.

Figure 2:
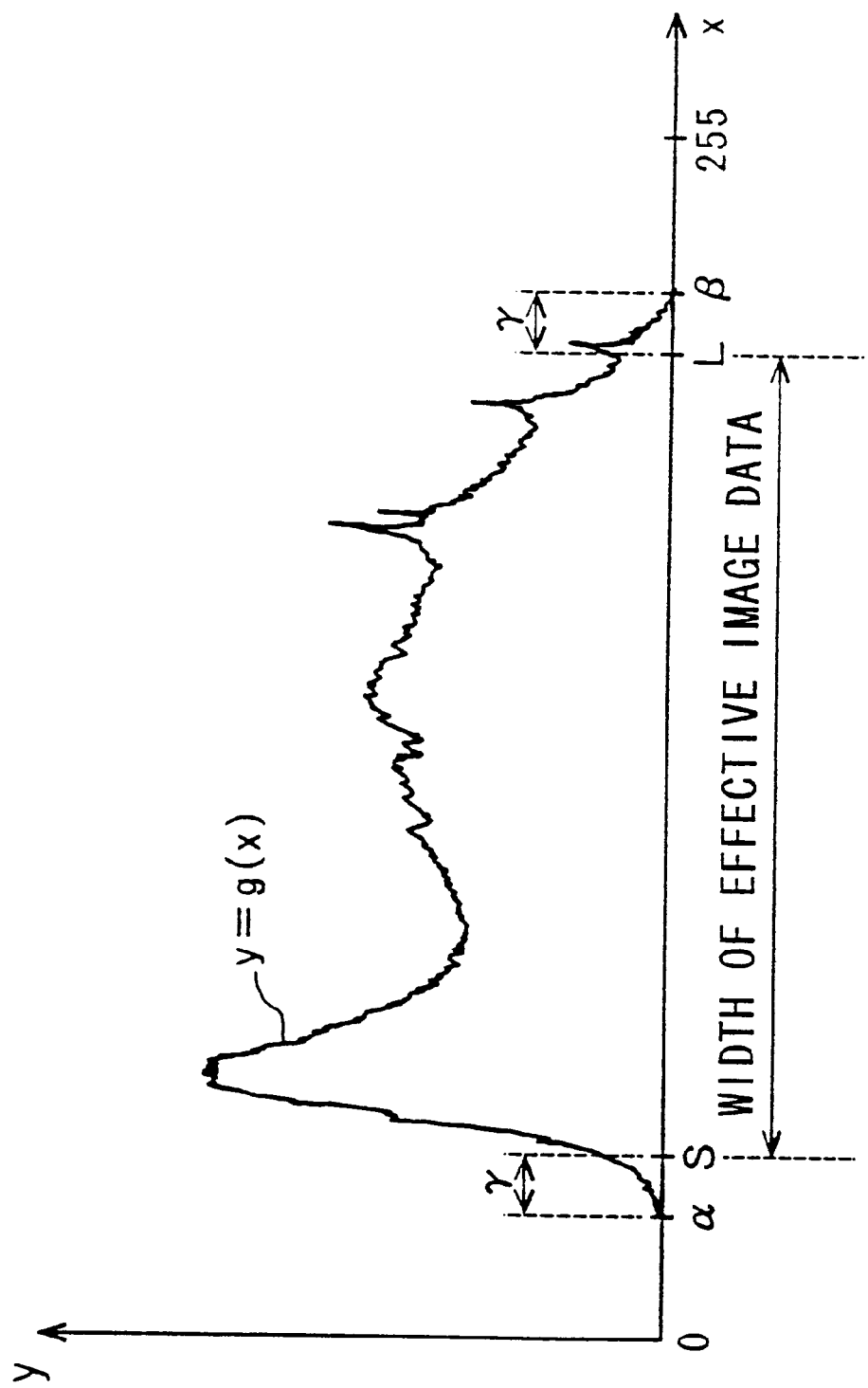
FIG. 2 is a graph showing a frequency distribution curve $y=g(x)$ of gradation data of all pixels including color image data C, M, Y.
Figure 3:
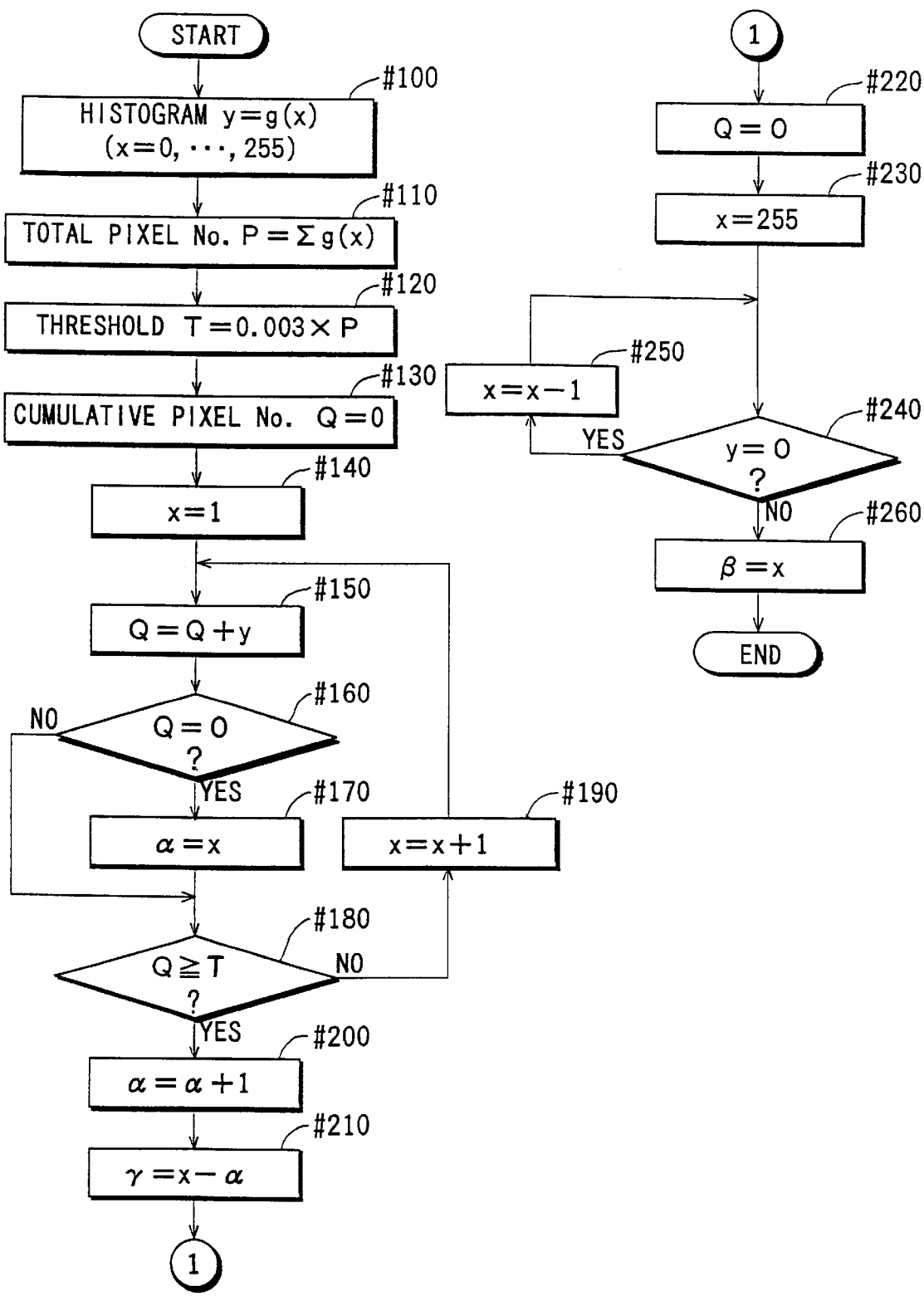
FIG. 3 is a flow chart showing a procedure for obtaining a range of effective image data.

Next, the operations performed in the CPU 6 during the pre-scanning are described with reference to FIGS. 2 and 3. FIG. 2 is a graph showing a frequency distribution curve $y=g(x)$ of the gradation data of all pixels including all color image data C, M, Y, and FIG. 3 is a flow chart showing a procedure for obtaining the range of the effective image data.

First, the frequency distribution curve $y=g(x)$ (where $x=0, 1, \ldots 255$) of the gradation data of all pixels shown in FIG. 2 is obtained (Step #100).

Subsequently, a total pixel number $P=\Sigma g(x)$ is obtained (Step #110), and a threshold value $T=0.003 \times P$ is calculated using this total pixel number (Step #120). In this embodiment, 0.3% of the total pixel number is set as a threshold value.

Subsequently, a cumulative pixel number Q used for the calculation is reset to 0 (Q=0) (Step #130), and the gradation data x is set at 1 (Step #140). This is to start the calculation from x=1 not from x=0 in order to omit x=0 which is a blank or white portion of the original.

Subsequently, the cumulative pixel number is calculated: Q=Q+y (Step #150). It is then discriminated whether Q=0 (Step #160). If Q=0 (YES in Step #160), α=x (Step #170) and Step #180 follows. On the other hand, if Q≠0 (NO in Step #160), Step #180 directly follows.

The cumulative pixel number Q and the threshold value T are then compared (Step #180). If Q<T (NO in Step #180), x is incremented (Step #190) and this routine returns to Step #150.

On the other hand, if Q≧T (YES in Step #180), a minimum value α (see FIG. 2) of the gradation data is obtained by α=α+1 (Step #200). Then, a gradation data width γ (see FIG. 2) corresponding to the threshold value T is obtained by γ=x−α using this minimum value α (Step #210).

Subsequently, the cumulative pixel number Q is reset to 0 (Q=0) (Step #220), and the gradation data x is set at 255 which is a maximum value as a digital value (Step #230). It is then discriminated whether y=0 (Step #240). If y=0 (YES in Step #240), x is decremented (Step #250) and this routine returns to Step #240. On the other hand, if y≠0 (NO in Step #240), a maximum value β (see FIG. 2) of the gradation data is obtained by β=x (Step #260).

Figure 4:
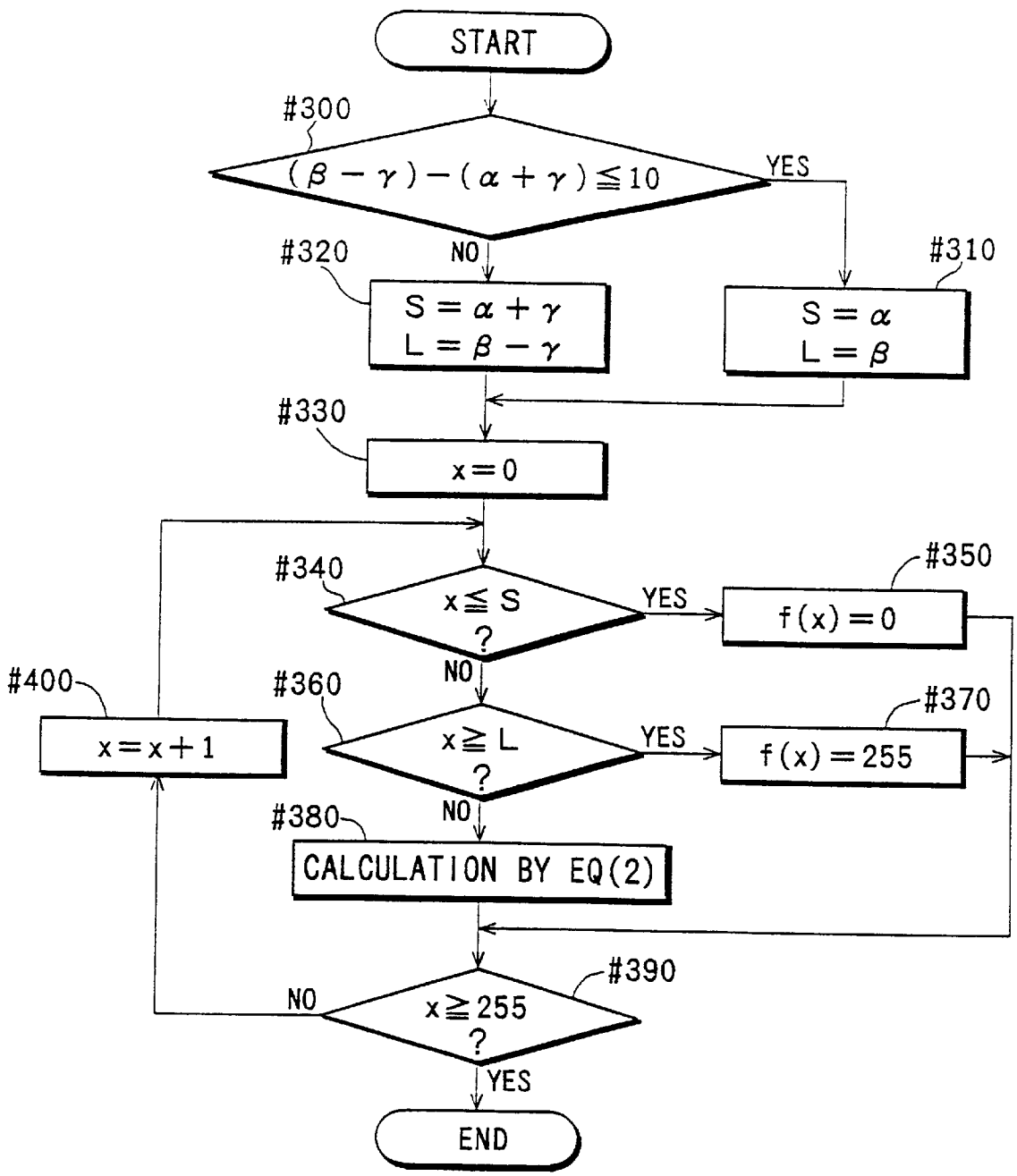
FIG. 4 is a flow chart showing a procedure for the correction of the gradation data.

Next, the gradation data correction performed in the gradation correcting device 28 during the main scanning is described with reference to FIGS. 2 and 4. FIG. 4 is a flow chart showing a procedure of the gradation data correction.

First, it is discriminated whether $(\beta-\gamma)-(\alpha+\gamma)\leq 10$ using the minimum value α and maximum value β of the gradation data and the gradation data width γ which are obtained during the pre-scanning (Step #300). If $(\beta-\gamma)-(\alpha+\gamma)\leq 10$ (YES in Step #300), a minimum value S of the effective image data (hereinafter, "effective minimum value") is set at α (S=α) and a maximum value L of the effective image data (hereinafter, "effective maximum value") is set at β (L=β) (Step #310) and Step #330 follows.

On the other hand, $(\beta-\gamma)-(\alpha+\gamma)>10$ (NO in Step #300), the effective minimum value S is set at α+γ (S=α+γ) and the effective maximum value L is set at β−γ (L=β−γ) (Step #320) and Step #330 follows.

Here, $\{(\beta-\gamma)-(\alpha+\gamma)\}$ represents the width of the effective image data as shown in FIG. 2. When this is equal to or smaller than a predetermined value (10 in this embodiment), the minimum and maximum values α, β of the gradation data are used as effective minimum and maximum values S, L.

Subsequently, the gradation data x is reset to 0 which is a minimum value as a digital data (Step #330) and is compared with the effective minimum value S (Step #S340). If x≦S (YES in Step #340), the gradation data after the correction f(x) is set at 0 (Step #350) and Step #390 follows.

On the other hand, if x>S (NO in Step #340), the gradation data is compared with the effective maximum value L (Step #360). If x≧L (YES in Step #360), f(x)=255 (Step #370) and Step #390 follows.

On the other hand, if x<L (NO in Step #360), the calculation by following equation (2) is performed (Step #380) and the gradation data x is compared with the maximum value 255 as a digital data (Step #390). If x<255 (NO in Step #390), x is incremented (Step #400) and this routine returns to Step #340. If x≧255 (YES in Step #390), this routine ends.

$$f(x)=[\{255-(S+L)\}x^2+(S+L)^2x-SL(S+L)-255S^2]/(L^2-S^2) \quad (2)$$

where x is a gradation data before the correction, S an effective minimum value, L an effective maximum value and f(x) a gradation data after the correction.

Next, a procedure for deriving equation (2) which is a quadratic conversion equation is described.

First, following equation (3) is put as a general quadratic equation.

$$f(x)=ax^2+bx+c \quad (3)$$

Further, following conditions are set as conditions for deriving the quadratic equation:

(1) The effective minimum value S becomes 0 after the conversion.

(2) The effective maximum value L becomes 255 after the conversion.

(3) This quadratic equation becomes a linear equation when a difference between the effective minimum value S and 0 and a difference between the effective maximum value L and 255 are equal.

The above conditions (1) to (3) can be expressed by equations (4) to (6):

$$f(S)=aS^2+bS+c=0 \quad (4)$$

$$f(L)=aL^2+bL+c=255 \quad (5)$$

$$a=0 \text{ when } S+L=255 \quad (6)$$

Following equation (7) can be obtained from the equations (4) and (5):

$$a(L^2-S^2)+b(L-S)=255$$

$$a(L^2+S^2)+b(L+S)+2c=255 \quad (7).$$

Accordingly, if a, c are expressed by b by transposing the equation (7), $$a=255/(L^2-S^2)-b/(L+S) \quad (8)$$

$$c=-SLb/(L+S)-255S^2/(L^2-S^2) \quad (9)$$

Following equation (10) can be obtained from the equations (6) and (8).

$$b=(L+S)^2/(L^2-S^2) \quad (10)$$

By substituting equation (10) into equations (8) and (9), following equations (11) and (12) can be obtained.

$$a=\{255-(L+S)\}/(L^2-S^2) \quad (11)$$

$$c=\{-SL(L+S)-255L^2\}/(L^2-S^2) \quad (12)$$

By substituting equations (10) to (12) into equation (3), equation (2) can be obtained.

As described above, according to this embodiment, the effective image data within the specified width are obtained in the frequency distribution curve $y=g(x)$ of the gradation data of all pixels of the color image data C, M, Y of three primary colors. Accordingly, a change of the color caused by obtaining the effective image data can be securely prevented.

In this embodiment, the pixels at the side of the minimum value α are accumulated and the gradation data width γ is obtained using the gradation data when the cumulative pixel number becomes equal to or larger than the threshold value T. The effective minimum and maximum values S, L are obtained using the same gradation data width γ at the sides of the minimum and maximum values α, β. However, the minimum and maximum values α, β of the gradation data are obtained and the gradation data within the width γ below and above these values α, β are cut. Accordingly, the use of the same gradation data width γ at the sides of the minimum and maximum values α, β does not adversely influence.

Next, the effects of the gradation correction by equation (2) which is a quadratic conversion equation is described with reference to FIGS. 5 to 11.

Figure 5A:
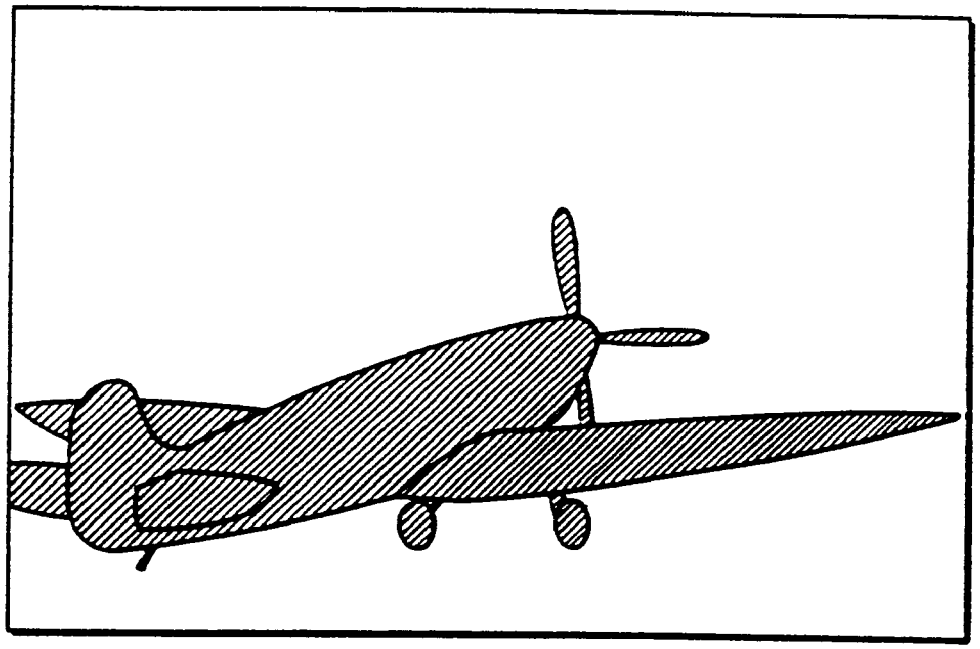
FIG. 5A is a photograph image having an excessively high density and FIG. 5B is a frequency distribution curve of gradation data of this image.
Figure 5B:
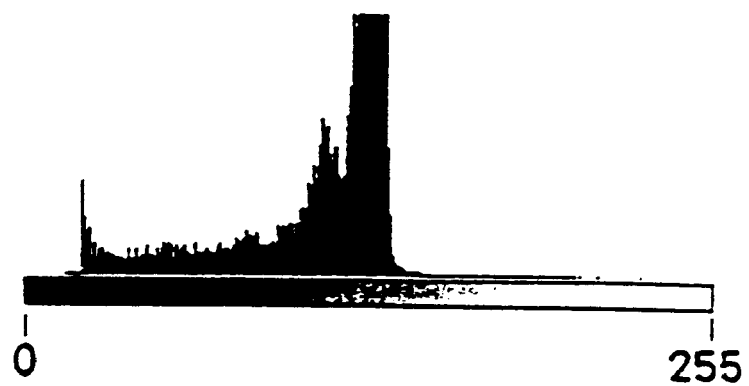
Figure 6A:
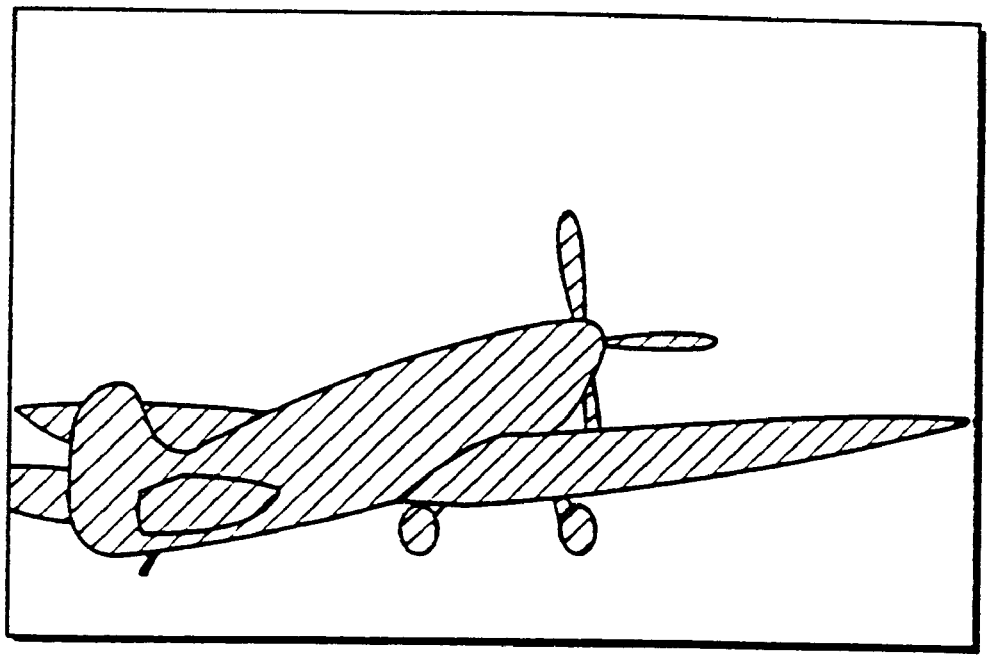
FIG. 6A is a photograph image having a medium density and FIG. 6B is a frequency distribution curve of gradation data of this image.
Figure 6B:
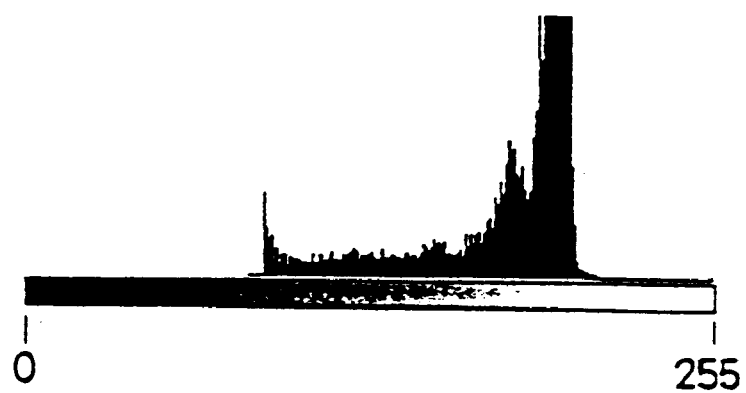
Figure 7A:
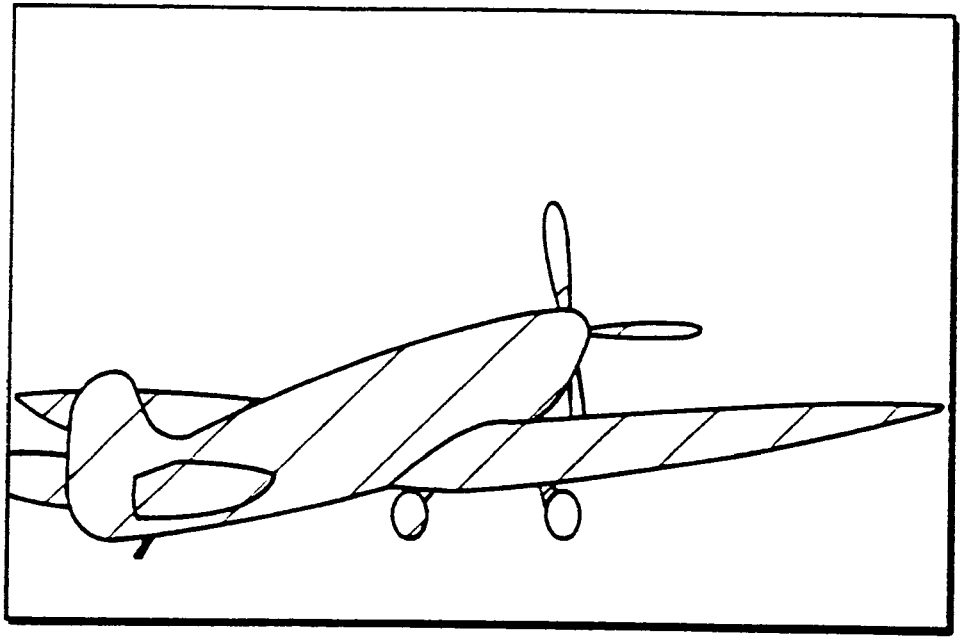
FIG. 7A is a photograph image having an excessively low density and FIG. 7B is a frequency distribution curve of gradation data of this image.
Figure 7B:
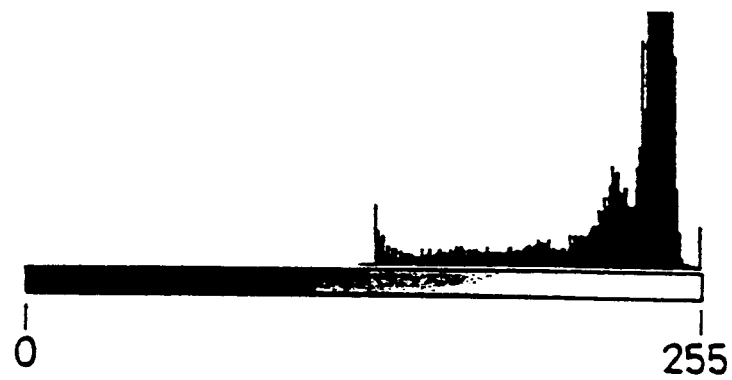

FIGS. 5, 6 and 7 are diagram showing the same image having different densities: an excessively high density, a medium density and an excessively low density, respectively. FIGS. 5A, 6A and 7A show photograph images, whereas FIGS. 5B, 6B and 7B are frequency distribution curves of the gradation data.

Figure 8A:
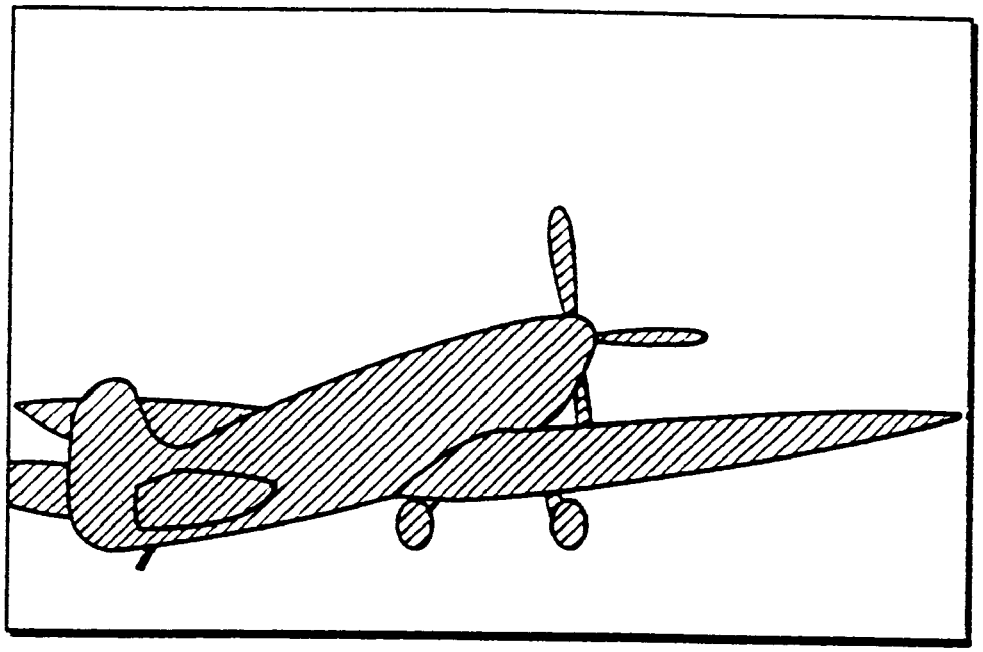
FIG. 8A is a photograph image obtained after a correction is applied to the image of FIG. 5 as an original image in accordance with equation (2) and FIG. 8B is a frequency distribution curve of the thus obtained image.
Figure 8B:
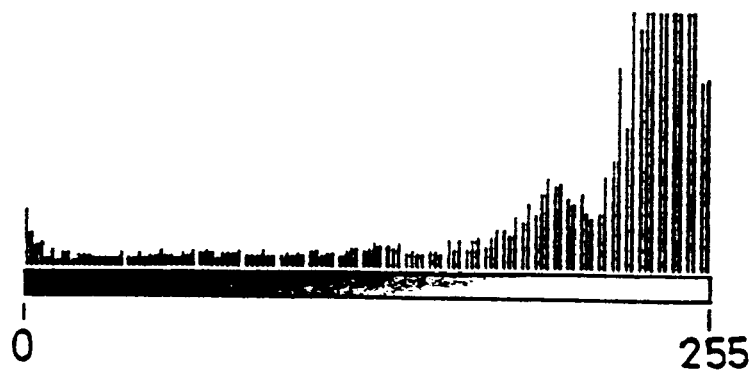
Figure 9A:
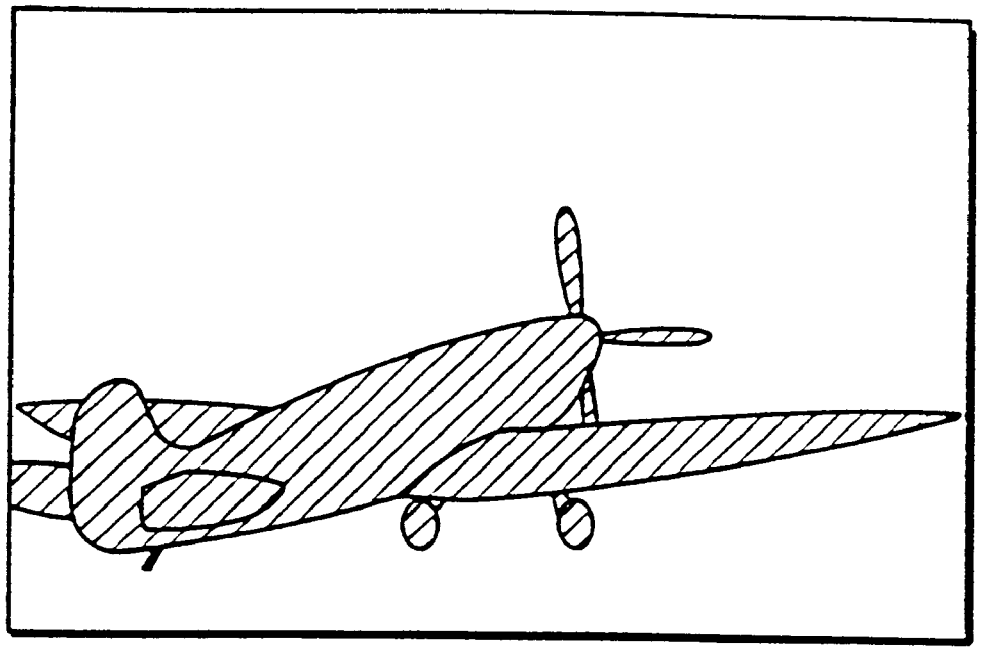
FIG. 9A is a photograph image obtained after a correction is applied to the image of FIG. 6 as an original image in accordance with equation (2) and FIG. 9B is a frequency distribution curve of the thus obtained image.
Figure 9B:
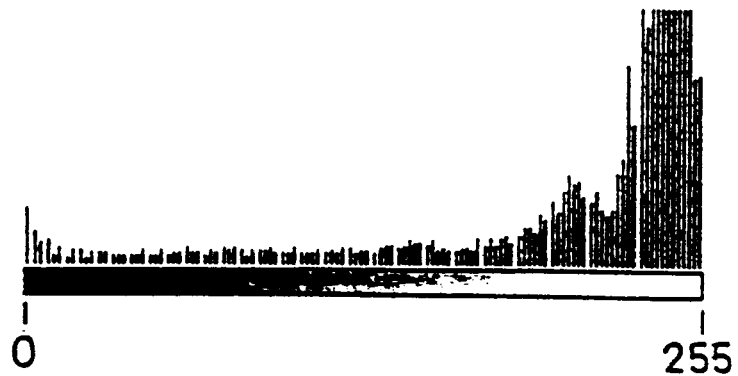
Figure 10A:
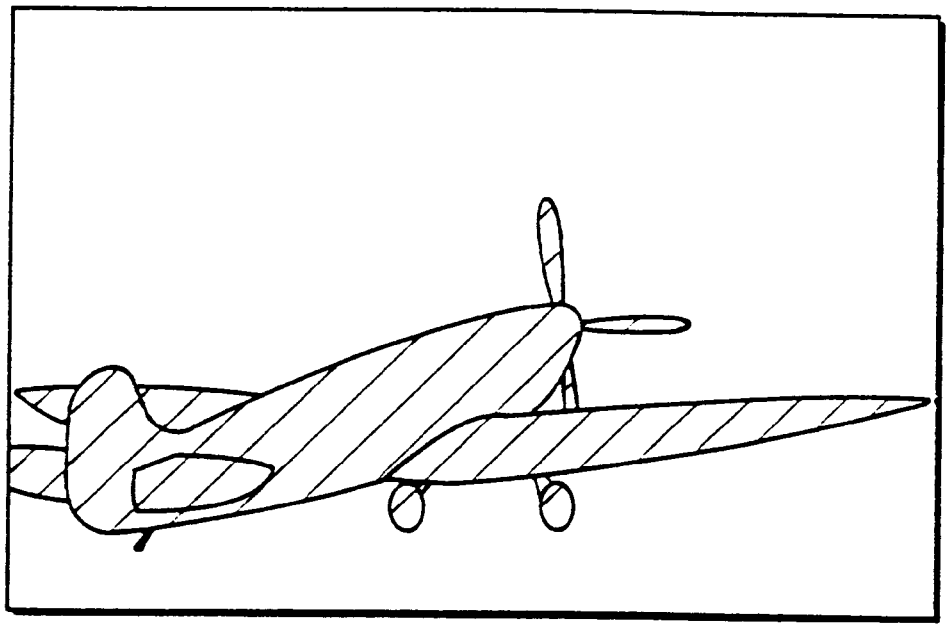
FIG. 10A is a photograph image obtained after a correction is applied to the image of FIG. 7 as an original image in accordance with equation (2) and FIG. 10B as a frequency distribution curve of the thus obtained image.
Figure 10B:

FIGS. 8, 9 and 10 show the result of the gradation correction by equation (2) using the images of FIGS. 5, 6 and 7 as an original image, respectively. FIGS. 8A, 9A and 10A show photograph images after the correction, whereas FIGS. 8B, 9B and 10B are frequency distribution curves of the gradation data after the correction.

Figure 11A:
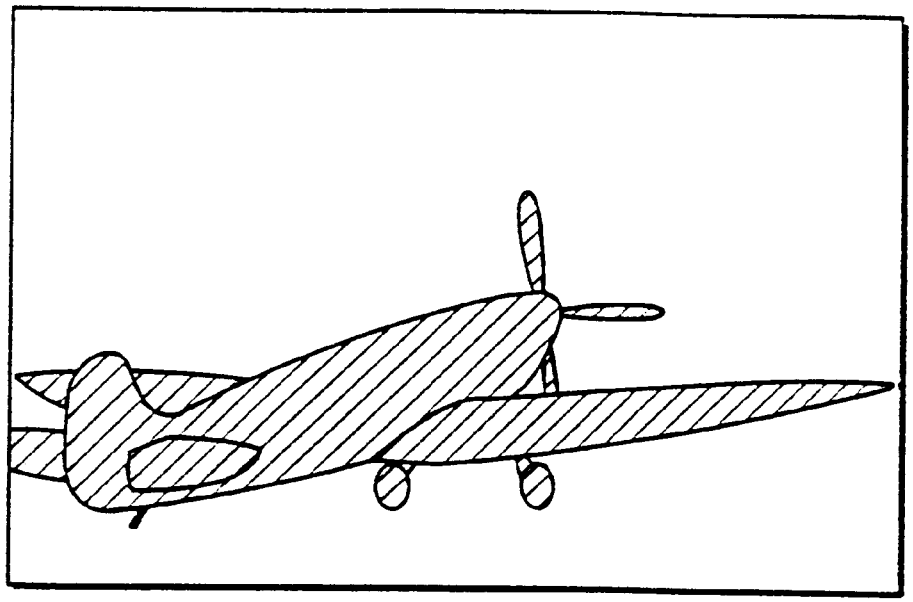
FIG. 11A is a photograph image obtained after a correction is applied to the images of FIGS. 5 to 7 as original images in accordance with equation (1) and FIG. 11B is a frequency distribution curve of the thus obtained image.
Figure 11B:
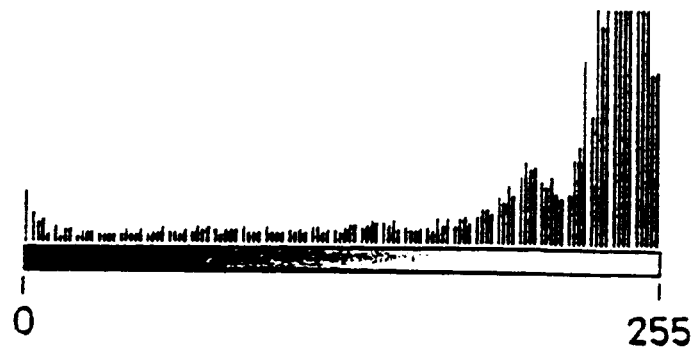

FIG. 11 shows a comparative example representing the result of the gradation correction by equation (1) which is a linear conversion equation using the images of FIGS. 5 to 7 as an original image. FIG. 11A shows a photograph image after the correction, whereas FIG. 11B is a frequency distribution curve of the gradation data after the correction.

The images of FIGS. 5A, 6A and 7A are such that a width (L−S) of the effective image data is equal and the frequency distribution of the gradation is same in a range of $S \leq x \leq L$ as shown in FIGS. 5B, 6B and 7B.

If the gradation correction is applied to the original images (FIGS. 5 to 7) using equation (2), images having densities corresponding to those of the original images are obtained as shown in FIGS. 8A, 9A and 10A. This result is also shown in the frequency distribution curves of FIGS. 8B, 9B and 10B. The density of histograms along x direction (0–255) near the gradation data x=255 (i.e. white) is: the density in FIG. 8<the density in FIG. 9<the density in FIG. 10, whereas the density of histograms along x axis direction (0–255) near the gradation data x=0 (i.e. black) is: the density in FIG. 8>the density in FIG. 9>the density in FIG. 10.

On the other hand, if the gradation correction is applied to the images of FIGS. 5 to 7 using the equation (1), the frequency distribution of the gradation data after the correction is identical as shown in FIG. 11B because the equation (1) is a linear conversion equation taking into account the range between the minimum and the maximum gradation data and a curve of the state of the frequency distribution despite the fact that the original images are images having different densities. Thus, the images of FIGS. 5 to 7 are corrected into images of the same density as shown in FIG. 11A.

If the gradation correction is applied using the linear equation (1), the density information of the original image is lost. Contrary to this, by using the equation (2) which is a quadratic conversion equation as in this embodiment, the gradation correction can be suitably applied while keeping the density information of the original image.

Although the images of FIGS. 5 to 10 are not color images, but monochromatic images, the effective minimum and maximum values can be obtained in the frequency distribution curve $y=g(x)$ of the gradation data of all pixels in the exactly same manner as in the case of a color image.

Further in the case that the original image is a monochromatic image, the gradation correction can be suitably applied while keeping the density information of the original image by using the equation (2) which is a quadratic equation.

In summary, regardless of the fact that the original image is a monochromatic image or a color image, the quadratic equation (2) can be used to correct the gradation data in such a manner to adequately maintain the density information of the original image not just because the equation is quadratic equation but because the equation (2) has a term representing the density information of the original image. In other words, using the linear equation (1) of the prior art reference, the density information of the original image will be lost because the information so as to represent where along the x direction (gradation 0–255) the data are concentrated or less concentrated is diminished.

Best way to see what is meant by "the preservation of the density information" using the quadratic equation (2) is comparisons between FIG. 5 and FIG. 8 (or FIG. 7 and FIG. 10). In FIG. 8, a photograph image and its frequency distribution curve corresponding to the original image of FIG. 5 having an excessively high density, it is clearly observed that the right hand side of frequency distribution curve along x direction is less dense than the left-hand side of the same curve along the x direction. This observation result tells us what the original image was like; as now seen in FIG. 5, the distribution curve as a whole is shifted to left hand side along the x-axis of FIG. 5b and the right hand side along the x-axis is rather empty. So, the empty portion of the FIG. 5b becomes less dense portion in FIG. 8b after gradation correction performed with the equation (2) and the vice versa.

Similarly, in FIG. 10, a photograph image and its frequency curve corresponding to the original image of FIG. 7 having an excessively low density, it is clearly observed that the left-hand side of frequency distribution curve along x direction is less dense than the right hand side of the same curve along the x direction. This observation result tells us what the original image was like; as now seen in FIG. 7b, the distribution curve as a whole is shifted to right hand side along the x-axis of FIG. 7b and the left hand side along the x-axis is rather empty. So, the empty portion of the FIG. 7b becomes less dense portion in FIG. 10b after gradation correction performed with the equation (2) and the vice versa.

The above observation results indicate what it is meant by the preservation of the density information of the original image after correction with the quadratic equation (2) is done. As now being obvious such density information, on the other hand, is just gone when performing the gradation correction with the linear equation (1) of the prior art reference.

Next, the operation of this embodiment is described.

First, pre-scanning is performed. In FIG. 1, the reflected light from the color original illuminated by an unillustrated illumination means is subjected to color separation by being converted into an electrical signal comprised of analog color image signals R, G, B and is further converted into 8-bit digital color image data R, G, B in the photoelectric converter 11. Subsequently, the color image data R, G, B are density-converted into the color image data C, M, Y and sent to the input device 21, where the respective processings are applied to the color image data C, M, Y.

Then, the CPU 6 calculates the minimum and maximum values $\alpha$, $\beta$ of the gradation data, and the gradation data width $\gamma$ corresponding to the threshold value T using the color image data C, M, Y.

Subsequently, main scanning is performed. Specifically, the color image data C, M, Y are obtained in the image reading unit 1 similar to the case of pre-scanning and sent to the input device 21, where the respective processings are applied to the color image data C, M, Y, which are then synchronously stored in the FIFO memories M1, M2, M3.

Subsequently, the color image data C, M, Y are read from the FIFO memories M1, M2, M3; a plurality of lines of the image data are stored in the line memory 221 of the image type discriminating device 22; and it is discriminated to which of the character area, the picture area and dot area the target color image data belongs.

On the other hand, the color image data C, M, Y stored in the FIFO memories M1, M2, M3 are synchronously sent to the black generating device 23 every pixel by the image type discriminating device 22.

Subsequently, the black image data BK is generated using the color image data C, M, Y in the black generating device 23, and the respective image data C, M, Y, BK are corrected using the generated black image data BK to obtain image data C', M', Y', BK' which are then sent to the output color selecting device 25.

Then, the color image data Y' is, for example, selected from the image data C', M', Y', BK' by the output color selecting device 25 and outputted to the magnifying device 26, where the selected image data is enlarged or reduced according to the set magnification.

Subsequently, the spatial filter 27 applies edge emphasis if the discrimination result by the image type discriminating device 22 is a character area while smoothing is applied if it is a picture area or a dot area.

Then, middle tone processing is applied in the gradation correcting device 28, and the laser beam emission control of the laser beam output unit 3 is performed in the output controller 29.

A laser beam corresponding to the color image data Y' is projected from the laser beam output unit 3 onto the photosensitive member of the image forming unit 4 charged at a specified level to form an electrostatic latent image on the surface thereof, and a Y-toner image obtained by developing this electrostatic latent image with Y-toner is transferred to a copy sheet.

Subsequently, the color image data M' is selected by the output color selecting device 25, and a M-toner image is transferred to the copy sheet in a similar procedure. The color image data C' is then selected, and a C-toner image is transferred to the copy sheet in a similar procedure. Finally, the black image data BK' is selected and a BK-toner image is transferred to the copy sheet in a similar procedure. After the transfer of the toner images of these four colors, the toner images are fixed to the copy sheet by the fixing device.

The present invention is not limited to the foregoing embodiment, but may take the following modifications (1) to (10).

(1) An external equipment 7 may also be provided as indicated in phantom line in FIG. 1.

If, for example, an external scanner is provided as the external equipment 7, a data read by the external scanner is inputted to the input device 21.

If a facsimile is provided as the external equipment, a data from the gradation correcting device 28 is outputted to the facsimile.

(2) An amount of the gradation data to be cut when the effective minimum and maximum values are calculated, i.e. a ratio of the number of pixels to be cut to the total pixel number when the threshold value T is calculated is not limited to 0.3%, but may be any suitable value.

There are images whose gradation data are skewed toward the minimum value $\alpha$ or the maximum value $\beta$. If the data of 0.3% of the pixels are uniformly cut from the minimum value $\alpha$ and the maximum value $\beta$ in such images, necessary data may be cut. Accordingly, in such a case, a satisfactory image can be obtained by setting the ratios smaller than 3%.

On the other hand, in the case of images where the gradation data do not exist near the minimum value $\alpha$ or the maximum value $\beta$, a satisfactory image can be obtained by setting the ratios larger than 3%.

(3) In the foregoing embodiment, the number of the pixels at the side of the minimum value $\alpha$ is accumulated and the effective minimum and maximum values S, L are calculated using the same gradation data width $\gamma$ at the sides of the minimum and maximum values $\alpha$, $\beta$. However, the number of the pixels at the side of the maximum value $\beta$ is accumulated and the effective minimum and maximum values S, L are calculated using the same gradation data width $\gamma$ at the sides of the minimum and maximum values $\alpha$, $\beta$.

Further, the number of the pixels may be accumulated at the sides of the minimum and maximum values $\alpha$, $\beta$, and the effective minimum and maximum values S, L may be calculated using the gradation data when the accumulated pixel number becomes equal to or larger than the threshold value T and using different gradation data widths $\gamma$.

(4) An experiment may be conducted using a variety of original images to determine a plurality of gradation data widths $\gamma$ and to store them in the ROM 61. Further, the operation unit 5 may be provided with a gradation data width selection key, so that a desired value of the gradation data width $\gamma$ can be selected by operating this selection key.

(5) The quadratic equation is not limited to equation (2).

First, a weighted average U' of the gradation data of all pixels is calculated from the frequency distribution curve y=g(x) of the gradation data of an original image. Let it be assumed that U is a gradation data closest to the weighted average U' among the gradation data x.

Further, condition (4) is put instead of the condition (3).

Condition (4): If the gradation data U is converted, it is located in the center of the gradation data.

The condition (4) can be expressed by following equation (13).

$$f(U)=aU^2+bU+c=255/2, S \leq U \leq L \tag{13}$$

If a, b, c of equation (3) are calculated using equations (4), (5) and (13), they are expressed as in equation (14).

$$a=255(2U-(L+S))/\{2(S-U)(U-L)(L-S)\}$$
$$b=255(L^2+S^2-2U^2)/\{2(S-U)(U-L)(L-S)\}$$
$$c=255S(SL-2SU-L^2+2U^2)/\{2(S-U(U-L)(L-S)\} \tag{14}$$

The gradation correction may be performed using a quadratic equation obtained by putting equation (14) into equation (3).

(6) Although the effective image data width $\{(\beta-\gamma)-(\alpha+\gamma)\}$ is compared with 10 in Step #300 of the flow chart of FIG. 4, the predetermined value to be compared is not limited, but may be an other value.

An experiment may be conducted using a variety of original images to determine a plurality of predetermined values and store them in the ROM 61. Further, the operation unit 5 may be provided with a value selection key, so that a desired predetermined value can be selected by operating the value selection key.

(7) Although the light image of the original image is A/D converted into a digital value of 8 bits by the A/D converter of the photoelectric converter 11 of the image reading unit 1, it may be converted into a digital value of N bits (e.g. N=10) or the like.

In this case, equation (2) in the foregoing embodiment may be replaced by following equation (15), and equation (14) in the modification (5) may be replaced by equation (16).

$$f(x)=[\{A-(S+L)\}x^2+(S+L)^2x-SL(S+L)-AS^2]/(L^2S^2) \tag{15}$$
$$a=A\{2U-(L+S)\}/\{2(S-U)(U-L)(L-S)\}$$
$$b=A(L^2+S^2-2U^2)/\{2(S-U)(U-L)(L-S)\}$$
$$c=AS(SL-2SU-L^2+2U^2)/\{2(S-U)(U-L)(L-S)\} \tag{16}$$

It should be noted that, in equations (15), (16), $$A=2^N-1 \tag{17}$$

(8) In the foregoing embodiment, the minimum and maximum values $\alpha$, $\beta$ of the gradation data, and the gradation data width $\gamma$ corresponding to the threshold value T are calculated using the frequency distribution curve y=g(x) of the gradation data of all pixels including all color image data C, M, Y shown in FIG. 2, and the color image data C, M, Y are corrected using the same values $\alpha$, $\beta$, $\gamma$.

Contrary to this, in this modification (8), the CPU 6 has, in addition to the technique of the foregoing embodiment, a function of calculating frequency distribution curve $y_c=g_c(x)$, $y_M=g_M(x)$, $y_Y=g_Y(x)$ of the gradation data of all pixels of the respective color image data C, M, Y for the respective colors and individually calculating minimum values $\alpha_C$, $\alpha_M$, $\alpha_Y$ and maximum values $\beta_C$, $\beta_M$, $\beta_Y$ of the gradation data of the respective colors and gradation data widths $\gamma_C$, $\gamma_M$, $\gamma_Y$ corresponding to the threshold value T using the respective frequency distribution curves.

Further, the gradation correcting device 28 has, in addition to the technique of the foregoing embodiment, a function of correcting the color image data C using the respective values $\alpha_C$, $\beta_C$, $\gamma_C$ in accordance with the procedure of FIG. 2, correcting the color image data M using the respective values $\alpha_M$, $\beta_M$, $\gamma_M$ and correcting the color image data Y using the respective values $\alpha_Y$, $\beta_Y$, $\gamma_Y$.

Further, the operation unit 5 may also be provided with a correction selection key 53 as shown in phantom line of FIG. 1. This selection key is adapted to select either one of the technique of the foregoing embodiment for correcting the respective color image data using the same values $\alpha$, $\beta$, $\gamma$ and the technique for correcting the respective color image data C, M, Y using the individually calculated values $\alpha$, $\beta$, $\gamma$.

The CPU 6 and the gradation correcting device 28 perform the respective operations using the technique selected by the correction selection key 53.

According to this modification, a desired correcting technique can be selected. In the case that the respective values $\alpha$, $\beta$, $\gamma$ are individually calculated and the correction is performed using the respective values $\alpha$, $\beta$, $\gamma$ which differ depending on the color image data, satisfactory gradation data can be obtained although the color of the image after the correction may be different from that of the original image. Accordingly, either one of the techniques may be selected according to a user's taste and/or according to a desired image.

(9) The gradation correcting device 28 may be constructed by a logic circuit and the data processing of FIG. 4 may be performed by hardware. Alternatively, the gradation correcting device 28 may be constructed by a high speed microcomputer and the data processing of FIG. 4 may be performed by software.

(10) Although the invention is applied to the color digital copier equipped with the image reading unit 1 in the foregoing embodiment, an original image may be read by an image reader as a separate unit (image scanner) and the image data of the original may be inputted for the data processing.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image processing apparatus for applying data processing to gradation data of pixels of an input image, comprising:

effective minimum value calculation means for calculating a minimum gradation data level at which a predetermined p% of the pixels of the input image have gradation data at and below the minimum gradation data level as an effective minimum value of effective image data;

effective maximum value calculation means for calculating a maximum gradation data level at which a predetermined q% of the pixels of the input image have gradation data at and above the maximum gradation data level as an effective maximum value of the effective image data; and gradation correction means for correcting the effective image data, of the gradation data of all pixels of the pixels of the input image, which are between the effective minimum value and the effective maximum value in accordance with a predetermined function using the effective minimum value and the effective maximum value as parameters.

2. The image processing apparatus according to claim 1, wherein the predetermined function is a quadratic equation.

3. The image processing apparatus as defined in claim 1, wherein the predetermined q% is equal to the predetermined p%.

4. The image processing apparatus according to claim 1, further comprising:

the gradation data having a possible range from a minimum gradation data range level to a maximum gradation data range level; and second gradation correcting means for correcting the gradation data of pixels having values at or less than the effective minimum value to a level equal to the minimum gradation data range level, and for correcting the gradation data of pixels having values at or greater than the effective maximum value to a level equal to the maximum gradation data range level.

5. An image processing apparatus for applying data processing to gradation data of pixels of an input image, comprising:

effective minimum value calculation means for calculating a minimum gradation data level at which a predetermined p% of the pixels of the input image have gradation data at and below the minimum gradation data level as an effective minimum value of effective image data;

effective maximum value calculation means for calculating a maximum gradation data level at which a predetermined q% of the pixels of the input image have gradation data at and above the maximum gradation data level as an effective maximum value of the effective image data;

gradation correction means for correcting the effective image data, of the gradation data of all pixels of the pixels of the input image, which are between the effective minimum value and the effective maximum value in accordance with a predetermined function using the effective minimum value and the effective maximum value as parameters;

the gradation data including color gradation data separated into k colors for each pixel, where k is an integer of 2 or larger, and the effective minimum value and the effective maximum value being determined with the color gradation data of all k colors being considered as one group; and the gradation correction means correcting the gradation data of all the pixels for each of the respective colors having levels between the effective minimum value and the effective maximum value in accordance with the predetermined function for each of said k colors.

6. The image processing apparatus according to claim 5, further comprising:

color minimum value calculation means for calculating a minimum gradation data level at which the predetermined p% of all the pixels of the input image have color gradation data at and below the minimum gradation level as a color effective minimum value of the effective image data;

color maximum value calculation means for calculating a maximum gradation data level at which the predetermined q% of all the pixels of the input image have color gradation data at and above the maximum gradation data level as a color effective maximum value of the effective image data;

color gradation correction means for individually correcting the color gradation data of all the pixels of the respective colors between the color effective minimum value and the color effective maximum value for each of the k colors in accordance with the predetermined function, using the color effective minimum value and the color effective maximum value respectively in place of the effective minimum value and the effective maximum value as parameters; and correction selection means for correcting the gradation data using either one of the gradation correction means and the color gradation correction means.

7. The image processing apparatus according to claim 6, further comprising:

the gradation data having a possible range from a minimum gradation data range level to a maximum gradation data range level; and second gradation correcting means for correcting the gradation data of pixels having values at or less than the effective minimum value to a level equal to the minimum gradation data range level, and for correcting the gradation data of pixels having values at or greater than the effective maximum value to a level equal to the maximum gradation data range level.

8. The image processing apparatus according to claim 5, wherein k=3 and the color gradation data includes gradation data of cyan, magenta and yellow.

9. The image processing apparatus according to claim 5, further comprising:

the gradation data having a possible range from a minimum gradation data range level to a maximum gradation data range level; and second gradation correcting means for correcting the gradation data of pixels having values at or less than the effective minimum value to a level equal to the minimum gradation data range level, and for correcting the gradation data of pixels having values at or greater than the effective maximum value to a level equal to the maximum gradation data range level.

10. An image processing apparatus for applying data processing to gradation data of pixels of an input image, comprising:

effective minimum value calculation means for calculating a minimum gradation data level at which a predetermined p% of the pixels of the input image have gradation data at and below the minimum gradation data level as an effective minimum value of effective image data;

effective maximum value calculation means for calculating a maximum gradation data level at which a predetermined q% of the pixels of the input image have gradation data at and above the maximum gradation data level as an effective maximum value of the effective image data;

gradation correction means for correcting the effective image data, of the gradation data of all pixels of the pixels of the input image, which are between the effective minimum value and the effective maximum value in accordance with a predetermined function using the effective minimum value and the effective maximum value as parameters; and wherein the gradation data are digital data of N bits, where N is a positive integer, and the quadratic equation is:

$$f(x)=[\{A-(S+L)\}x^2+(S+L)^2x-SL(S+L)-AS^2]/(L^2-S^2)$$

where:

$A=2^N-1$;

x is the gradation data before the correction;

S is the effective minimum value;

L is the effective maximum value; and f(x) is the gradation data after the correction.

11. The image processing apparatus according to claim 10, further comprising:

the gradation data having a possible range from a minimum gradation data range level to a maximum gradation data range level; and second gradation correcting means for correcting the gradation data of pixels having values at or less than the effective minimum value to a level equal to the minimum gradation data range level, and for correcting the gradation data of pixels having values at or greater than the effective maximum value to a level equal to the maximum gradation data range level.

12. An image processing apparatus for applying data processing to gradation data of pixels of an input image, comprising:

gradation correction means for correcting the gradation data of all the pixels of the input image within a certain range using a predetermined quadratic equation which is a function of the gradation data of each respective one of the pixels having a square term or higher term of the gradation data of the respective one of the pixels; and wherein the quadratic equation is in the form: f(x)=ax2+bx+c where a, b, and c are coefficients and are obtained by complying with the following conditions:

(A) f(S)=0;

(B) f(L)=255; and (C) a=0 when S+L=255 wherein S is an effective minimum value gradation data and L is an effective maximum gradation data.

13. The image processing apparatus as defined in claim 12, further comprising:

effective minimum value calculation means for calculating a minimum gradation data level at which a predetermined p% of the pixels of the input image have gradation data at and below the minimum gradation data level as the effective minimum value gradation data (S) of effective image data; and effective maximum value calculation means for calculating a maximum gradation data level at which a predetermined q% of the pixels of the input image have gradation data at and above the maximum gradation data level as the effective maximum value gradation data (L) of the effective image data.

14. The image processing apparatus as defined in claim 13, wherein the predetermined p% is equal to the predetermined q%.

15. The image processing apparatus as defined in claim 13, wherein the certain range is an effective range between the effective minimum gradation value (S) and the effective maximum gradation value (L).

16. The image processing apparatus according to claim 13, further comprising:

the gradation data having a possible range from a minimum gradation data range level to a maximum gradation data range level; and second gradation correcting means for correcting the gradation data of pixels having values at or less than the effective minimum value gradation data (S) to a level equal to the minimum gradation data range level, and for correcting the gradation data of pixels having values at or greater than the effective maximum value gradation data (L) to a level equal to the maximum gradation data range level.

17. An image processing apparatus for applying data processing to gradation data of pixels of an input image wherein the gradation data has a possible range from a minimum gradation data range level to a maximum gradation data range level, comprising:

effective minimum value calculation means for determining a minimum gradation data level $\alpha$ of said gradation data, for calculating a minimum effective gradation data level S at which a predetermined p% of the pixels of the input image have gradation data at and below the minimum effective gradation data level S, and for calculating a gradation data cut width y equal to a difference between the minimum effective gradation data level S and the minimum gradation data level $\alpha$, wherein the minimum effective gradation data level S is a minimum level of effective image data;

effective maximum value calculation means for determining a maximum gradation data level $\beta$ of said gradation data, and for calculating a maximum effective gradation data level L equal to the maximum gradation data level $\beta$ minus the gradation data cut width $\gamma$, wherein the maximum effective gradation data level L is a maximum level of the effective image data; and gradation correction means for correcting the effective image data, which consists of the gradation data of all of the pixels of the input image having levels between the effective minimum value and the effective maximum value, in accordance with a predetermined function using the minimum effective gradation data level S and the maximum effective gradation data level L as parameters.

18. The image processing apparatus of claim 17, wherein:

the gradation data includes color gradation data separated into k colors for each pixel, where k is an integer of 2 or larger, and the minimum effective gradation data level S and the maximum effective gradation data level L are calculated based on all the color gradation data as one group; and the gradation correction means corrects the color gradation data of the effective gradation data for each of the K colors in accordance with the predetermined function.

19. The image processing apparatus according to claim 18, further comprising:

means for operating said minimum value calculation means upon the color gradation data of each of the respective individual ones of the k colors, in place of said gradation data, to calculate for each color a minimum gradation data level $\alpha$, a minimum effective gradation data level S, and a gradation data cut width $\gamma$;

means for operating said maximum value calculation means upon the color gradation data of each of the respective individual ones of the k colors, in place of said gradation data, to calculate for each color a maximum gradation data level $\beta$, and a maximum effective gradation data level L;

color gradation correction means for individually correcting the color gradation data, of each of the k colors, which fall between the effective minimum value and the effective maximum value for the respective one of the k colors in accordance with the predetermined function, using the effective minimum value and the effective maximum value for the respective one of the k colors as parameters; and correction selection means for correcting the gradation data using either one of the gradation correction means and the color gradation correction means.

20. The image processing apparatus according to claim 19, wherein:

the predetermined function is a quadratic equation; and the gradation data are digital data of N bits, where N is a positive integer, and the quadratic equation is:

$$f(x)=[\{A-(S+L)\}x^2+(S+L)^2x-SL(S+L)-AS^2]/(L^2-S^2)$$

where:
$A=2^N-1$;
x is the gradation data before the correction;
S is the minimum effective data level S;
L is the maximum effective data level L; and
f(x) is the gradation data after the correction.

21. The image processing apparatus according to claim 20, further comprising second gradation correcting means for correcting the gradation data of pixels having values at or less than the minimum effective data level S to a level equal to the minimum gradation data range level, and for correcting the gradation data of pixels having values at or greater than the maximum effective data level L to a level equal to the maximum gradation data range level.

22. The image processing apparatus according to claim 17, wherein:

the predetermined function is a quadratic equation; and the gradation data are digital data of N bits, where N is a positive integer, and the quadratic equation is:

$$f(x)=[\{A-(S+L)\}x^2+(S+L)^2x-SL(S+L)-AS^2]/(L^2-S^2)$$

where:
$A=2^N-1$;
x is the gradation data before the correction;
S is the minimum effective data level S;
L is the maximum effective data level L; and
f(x) is the gradation data after the correction.

23. The image processing apparatus according to claim 22, further comprising second gradation correcting means for correcting the gradation data of pixels having values at or less than the minimum effective data level S to a level equal to the minimum gradation data range level, and for correcting the gradation data of pixels having values at or greater than the maximum effective data level L to a level equal to the maximum gradation data range level.

24. The image processing apparatus according to claim 17, further comprising second gradation correcting means for correcting the gradation data of pixels having values at or less than the minimum effective data level S to a level equal to the minimum gradation data range level, and for correcting the gradation data of pixels having values at or greater than the maximum effective data level L to a level equal to the maximum gradation data range level.

25. An image processing apparatus for applying data processing to gradation data of pixels of an input image wherein the gradation data has a possible range from a first gradation data range extreme to a second gradation data range extreme, comprising:

effective first value calculation unit including:
means for determining a first gradation data end level at which said gradation data first occurs as determined proceeding from said first gradation data range extreme to said second gradation data range extreme; and
means for calculating a first effective gradation data level which defines a gradation data cut level width extending from the first gradation data end level to the first effective gradation data level within which fall the gradation data of a predetermined p% of the pixels of the input image, the first effective gradation data level being a first effective range extreme of effective image data;

effective second value calculation unit including:
means for determining a second gradation data end level of said gradation data at which said gradation data first occurs as determined proceeding from said second gradation data range extreme to said first gradation data range extreme; and
means for calculating a second effective gradation data level equal to the second gradation data end level and an increment of an amount of the gradation data cut level width further toward said first gradation data range extreme, wherein the second effective gradation data level is a second effective range extreme of the effective image data; and gradation correction means for correcting the effective image data, which consists of the gradation data of all of the pixels of the input image having levels between the first effective gradation level and the second effective gradation level, in accordance with a predetermined function using the first effective gradation data level and the second effective gradation data level as parameters.

26. The image processing apparatus according to claim 25, further comprising second gradation correcting means for correcting the gradation data of pixels having values at and between the first effective gradation data level and the first gradation data range extreme to a level equal to the first gradation data range extreme, and for correcting the gradation data of pixels having values at or between the second effective gradation data level and the second gradation data range extreme to a level equal to the second gradation data range extreme.

27. The image processing apparatus according to claim 26, wherein the gradation data are digital data of N bits, where N is a positive integer, and the predetermined function is a quadratic equation:

$$f(x)=[\{A-(S+L)\}x^2+(S+L)^2x-SL(S+L)-AS^2]/(L^2-S^2)$$

where:
$A=2^N-1$;
x is the gradation data before the correction;
S is the first effective gradation data level;
L is the second effective gradation data level;
f(x) is the gradation data after the correction;
the first gradation data range extreme is equal to one of zero and A; and
the second gradation data range extreme is equal to another one of zero and A.

28. The image processing apparatus of claim 25, wherein:
the gradation data includes color gradation data separated into k colors for each pixel, where k is an integer of 2 or larger, and the first effective gradation data level and the second effective gradation data level are calculated based on all the color gradation data as one group; and the gradation correction means corrects the color gradation data of the effective gradation data for each of the K colors in accordance with the predetermined function using the first effective gradation data level and the second effective gradation data level as parameters.

29. The image processing apparatus according to claim 28, further comprising second gradation correcting means for correcting the gradation data of pixels having values at and between the first effective gradation data level and the first gradation data range extreme to a level equal to the first gradation data range extreme, and for correcting the gradation data of pixels having values at or between the second effective gradation data level and the second gradation data range extreme to a level equal to the second gradation data range extreme.

30. The image processing apparatus according to claim 28, further comprising:

effective first color value calculation unit for performing calculations on the color gradation data of each of said k colors independently, the effective first color value calculation unit including:
  means for determining a first color gradation data end level at which said color gradation data first occurs as determined proceeding from said first gradation data range extreme to said second gradation data range extreme; and
  means for calculating a first effective color gradation data level which defines a color gradation data cut level width extending from the first color gradation data end level to the first effective color gradation data level within which fall the color gradation data of a predetermined p% of the pixels of the input image, the first effective color gradation data level being a first effective color range extreme of effective color image data;

effective second color value calculation unit for performing calculations on the color gradation data of each of said k colors independently, the effective second color value calculation unit including:
  means for determining a second color gradation data end level of said color gradation data at which said color gradation data first occurs as determined proceeding from said second gradation data range extreme to said first gradation data range extreme; and
  means for calculating a second effective color gradation data level equal to the second color gradation data end level and an increment of the amount of the color gradation data cut level width further toward said first gradation data range extreme, wherein the second effective color gradation data level is a second effective color range extreme of the effective color image data;

color gradation correction means for individually correcting the color gradation data of the respective ones of said k colors between respective ones of the first effective color range extreme and the second effective color range extreme for each of the k colors in accordance with the predetermined function, using the first effective color range extreme and the second effective color range extreme, for the respective one of the k colors, as parameters in the predetermined function; and correction selection means for correcting the gradation data using either one of the gradation correction means and the color gradation correction means.

31. The image processing apparatus according to claim 30, further comprising second gradation correcting means, used in conjunction with the gradation correcting means, for correcting the gradation data of pixels having values at and between the first effective gradation data level and the first gradation data range extreme to a level equal to the first gradation data range extreme, and for correcting the gradation data of pixels having values at or between the second effective gradation data level and the second gradation data range extreme to a level equal to the second gradation data range extreme.

32. The image processing apparatus according to claim 31, further comprising second color gradation correcting means, used in conjunction with the color gradation correcting means, for correcting the color gradation data of pixels having values at and between the first effective color gradation data level, of the respective one of the k colors, and the first gradation data range extreme to a level equal to the first gradation data range extreme, and for correcting the color gradation data of pixels having values at or between the second effective color gradation data level, of the respective one of the k colors, and the second gradation data range extreme to a level equal to the second gradation data range extreme.

33. The image processing apparatus according to claim 28, wherein the gradation data are digital data of N bits, where N is a positive integer, and the predetermined function is a quadratic equation:

$$f(x)=[\{A-(S+L)\}x^2+(S+L)^2x-SL(S+L)-AS^2]/(L^2-S^2)$$

where:
  $A=2^N-1$;
  x is the gradation data before the correction;
  S is the first effective gradation data level;
  L is the second effective gradation data level;
  f(x) is the gradation data after the correction;
  the first gradation data range extreme is equal to one of zero and A; and
  the second gradation data range extreme is equal to another one of zero and A.

34. The image processing apparatus according to claim 25, wherein the gradation data are digital data of N bits, where N is a positive integer, and the predetermined function is a quadratic equation:

$$f(x)=[\{A-(S+L)\}x^2+(S+L)^2x-SL(S+L)-AS^2]/(L^2-S^2)$$

where:
  $A=2^N-1$;
  x is the gradation data before the correction;
  S is the first effective gradation data level;
  L is the second effective gradation data level;
  f(x) is the gradation data after the correction;
  the first gradation data range extreme is equal to one of zero and A; and
  the second gradation data range extreme is equal to another one of zero and A.

* * * * *